(12) United States Patent
Loustanau et al.

(10) Patent No.: US 7,771,123 B2
(45) Date of Patent: Aug. 10, 2010

(54) CONNECTION DEVICE FOR CONNECTING A ROLLING CONTACT BEARING TO AN EXTERNAL BODY

(75) Inventors: Jean-Gérard Loustanau, Fondettes (FR); Domenico Ducci, Marentino (IT); Marcus Caldana, Lidköping (SE)

(73) Assignees: Aktiebolaget SKF, Gothenburg (SE); Minganti International Ltd., Dublin (IE)

( * ) Notice: Subject to any disclaimer, the term of this patent is extended or adjusted under 35 U.S.C. 154(b) by 1369 days.

(21) Appl. No.: 11/126,809

(22) Filed: May 11, 2005

(65) Prior Publication Data

US 2006/0029315 A1 Feb. 9, 2006

(51) Int. Cl.
F16C 19/00 (2006.01)
(52) U.S. Cl. ........................ 384/513; 384/537; 384/544; 384/589
(58) Field of Classification Search ............... 384/490, 384/513, 515, 537, 548, 550, 559, 569, 584, 384/585, 544, 589, 906; 403/359.6, 383
See application file for complete search history.

(56) References Cited

U.S. PATENT DOCUMENTS 5,716,159 A * 2/1998 Tomikawa ............... 403/359.6

| | | | |
|---|---|---|---|
| 6,230,848 B1 | 5/2001 | Niebling et al. | |
| 6,357,557 B1 | 3/2002 | Di Ponio | |
| 6,450,585 B1 | 9/2002 | Kochsiek | |

FOREIGN PATENT DOCUMENTS

| | | |
|---|---|---|
| DE | 198 30 666 A1 | 1/2000 |
| EP | 0 783 980 A1 | 7/1997 |
| EP | 0 860 626 A2 | 8/1998 |
| FR | 2 810 382 | 12/2001 |
| WO | WO 2004/091938 A1 | 10/2004 |

* cited by examiner

*Primary Examiner*—William C Joyce
(74) *Attorney, Agent, or Firm*—Merchant & Gould P.C.

(57) ABSTRACT

Connection device (100) for connecting a contact rolling bearing (1) to an external body (7), the connection device (100) presenting a peripheral connecting outline (5), which is obtained around a race (3) of the contact rolling bearing, and a complementary connecting outline (6), which is obtained inside the external body (7), and which presents a shape such as to complement the connecting peripheral outline (5) in order to render angularly integral in relation to each other the external body (7) and the first race (3), the connecting peripheral outline (5) and the complementary connecting outline (6) both presenting a radius (R) which is of variable angular dimensions with continuity on a plane which is transverse to the rotation axis (A), and are both provided, in relation to the rotation axis A, with at least one respective convex portion (51).

3 Claims, 5 Drawing Sheets

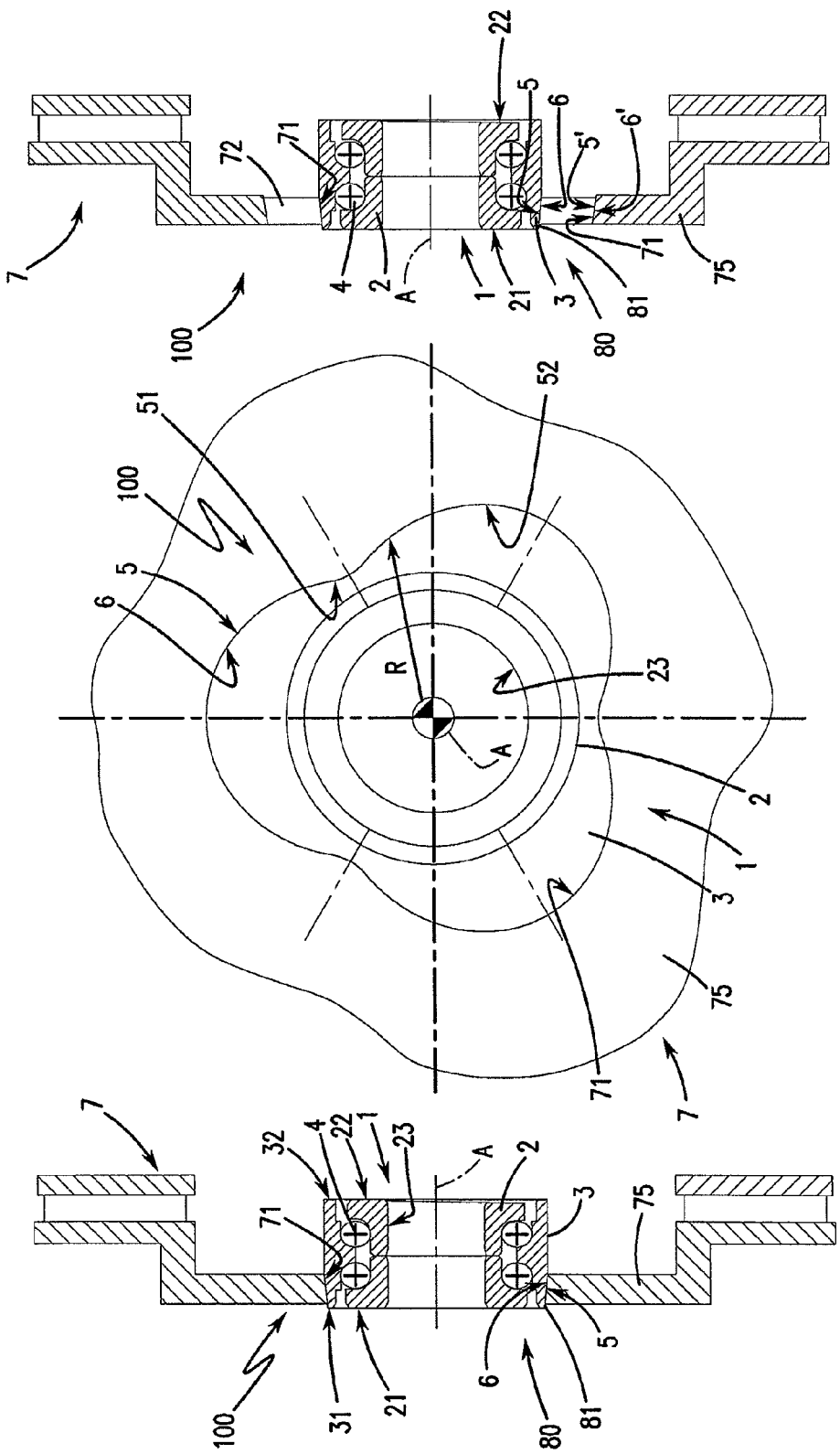

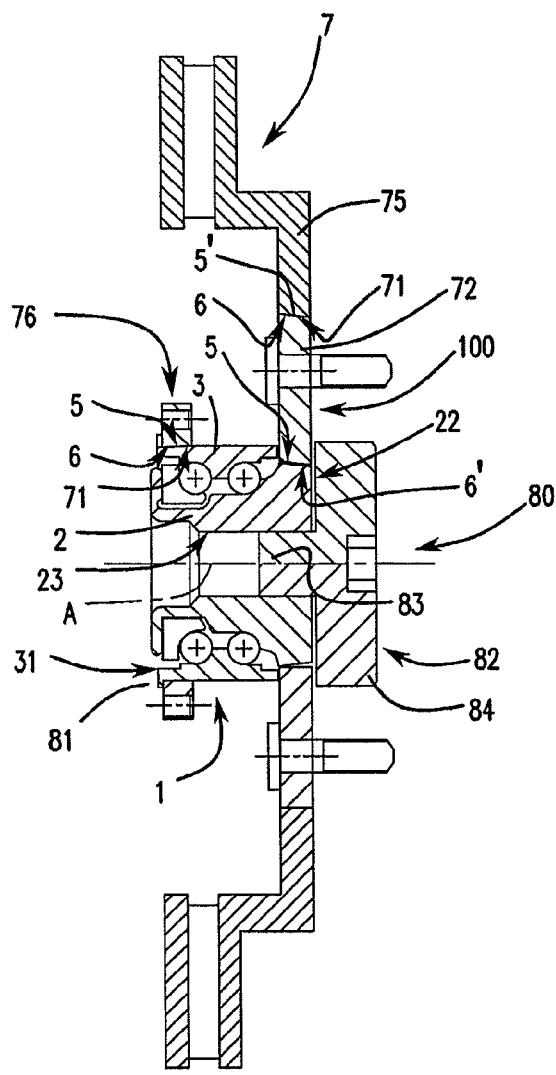
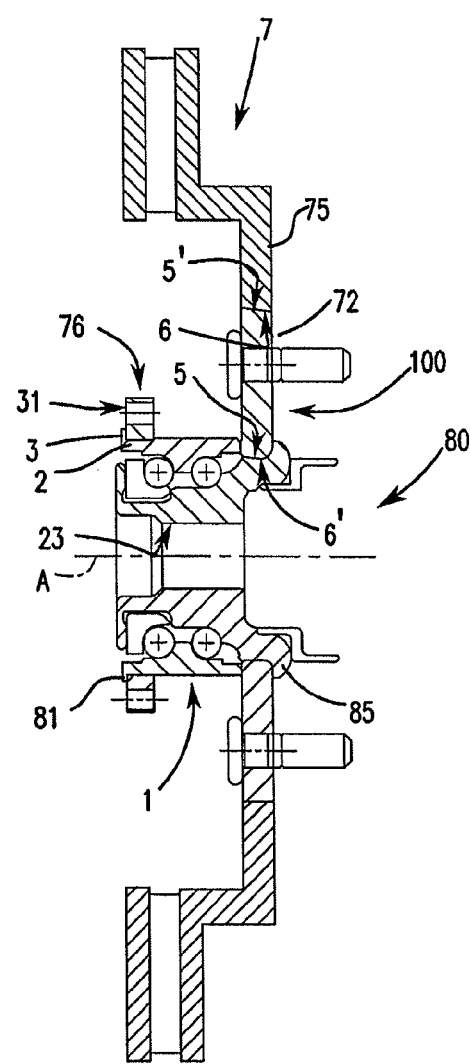

CONNECTION DEVICE FOR CONNECTING A ROLLING CONTACT BEARING TO AN EXTERNAL BODY

BACKGROUND OF THE INVENTION

The present invention relates to a connection device for connecting a rolling contact bearing to an external body.

DESCRIPTION OF THE PRIOR ART

The U.S. Pat. No. 6,230,841 refers to a rolling contact bearing for a wheel hub unit with a brake disk, in which the bearing is provided with an outer race, and the connection device comprises a peripheral connecting outline which is produced around the outer race by means of a polygonal surface, and a complementary connecting outline which is obtained inside the brake disk, and which is grafted onto the peripheral connecting outline in order to render angularly integral in relation to each other the brake disk itself and the outer race of the bearing.

SUMMARY OF THE INVENTION

The above-described connection device essentially presents two disadvantages which are due to the conformation of the peripheral connecting outline. In the first place, the polygonal shape of the relative surface, while guaranteeing the stability of the angular coupling between the outer race and the brake disk, requires a considerable amount of production time, and also involves the occurrence of local plastic phenomena which shorten the useful working life of the rolling contact bearing.

The above-mentioned American patent also describes the option of producing the peripheral connecting outline according to standards which are stipulated by the regulation DIN 32711, which comprises three lobes which are inscribed in a base circumference and a head/top circumference, and the dimensions of which are produced by taking into consideration the data which relate to the transmittable torque, the data which relate to the material from which they are to be produced, and information relating to the particular application of the outline.

Despite, however, the production of such dimensions, experience in the field of rolling contact bearings in general, and in the field of rolling contact bearings for wheel hub units in particular, has demonstrated that the connecting outlines for the above-described connection devices present some disadvantages which are due to the typical stress which is inherent in this kind of application and which does not, among other things, guarantee constant values of transmittable torque. In addition, the above-described connection devices do not at all match current requirements in terms of a greater standardisation of the products with the aim of reducing costs and production times.

The aim of the present invention is to produce a connection device for connecting a rolling contact bearing to an external body, which will not only resolve the above-described disadvantages but will also be easy and cost-effective to produce.

According to the present invention a connection device for connecting a rolling contact bearing to an external body will be produced, the bearing presenting a rotation axis, and comprising two races which are co-axial in relation to each other and in relation to the rotation axis, the connection device comprising a peripheral connecting outline, which is circumferentially obtained along a first race of the said two races, and a complementary connecting outline, which is circumferentially obtained along the external body, and which presents a shape such as to complement the peripheral connecting outline in order to render angularly integral in relation to each other the external body and the said first race; the connection device being characterised by the fact that the peripheral connecting outline and the complementary connecting outline both present a radius of angularly variable dimensions with continuity on a plane which is transverse to the rotation axis, and both comprise, in relation to the rotation axis, at least one respective convex portion.

In addition, in the above-mentioned American patent, the connection device also comprises an axial blocking element of the external body on the outer race which is defined by an annular border, which extends radially from and transverse to the peripheral connecting outline, and which axially delimits the peripheral connecting outline in order to define an axial ledge for the external body.

The presence of the axial blocking element renders even more difficult and onerous the production of the peripheral connecting outline, and thus an additional aim of the present invention is to produce a connection device for connecting a contact rolling bearing to an external body, which will be extremely simple to produce and which will be extremely cost-effective as compared with the kind of connection devices which are currently in production.

Preferably, as regards the connection device which has been defined above, the peripheral connecting outline is conformed according to a tapering shape in relation to the rotation axis.

BRIEF DESCRIPTION OF THE DRAWINGS

The present invention will now be described with reference to the attached drawings, which illustrate a non-limiting form of embodiment of the present invention, and in which:

FIG. 1 is a section view of a first preferred form of embodiment of the present invention relating to a connection device for connecting a rolling contact bearing to an external body produced according to the present invention;

FIG. 2 is a section along the line II-II which is shown in FIG. 1; and

FIGS. 3 to 11 illustrate, in section, respective alternative preferred forms of embodiment of the connection device which is shown in FIG. 1.

DETAILED DESCRIPTION OF THE PREFERRED EMBODIMENT

Figure 6:
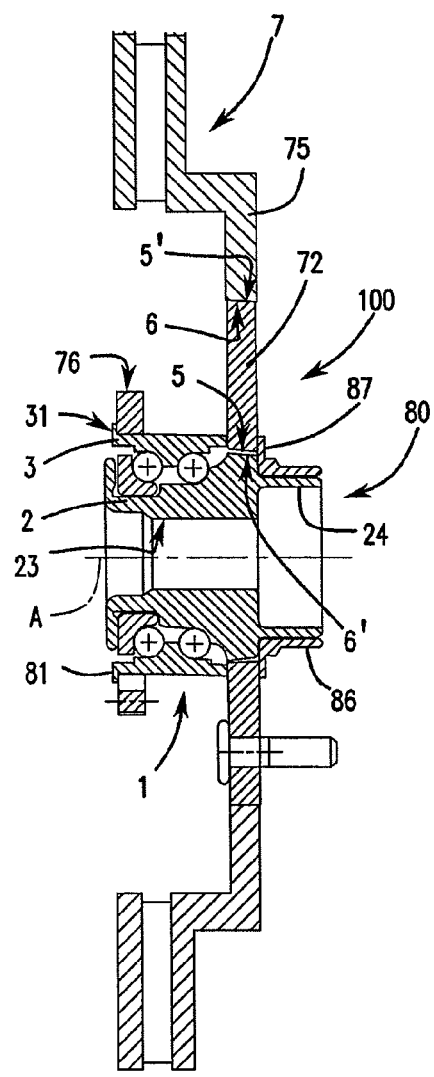

With reference to FIG. 1, the number 100 indicates a connection device for connecting a rolling contact bearing 1 to an external body 7 in its entirety.

The bearing 1 presents a rotation axis A, and comprises an inner race 2 which is co-axial to the axis A, an outer race 3 which is co-axial to the inner race 2, and a number of rolling bodies 4 which are interposed between the two races 2 and 3.

The inner race 2 is delimited, in an axial direction, by two annular surfaces 21 and 22 which are transverse to the axis A, and, in a radial direction, by an internal cylindrical housing 23 which is co-axial to the axis A. While the outer race 3 is delimited, in an axial direction, by two annular surfaces 31 and 32 which are transverse to the axis A, and, in a radial direction, by an external cylindrical surface 33 which is co-axial to the axis A.

The external body 7 is defined by a brake disk, and comprises an internal housing 71 which is engaged by the bearing 1, and an annular body 75, which is arranged transverse to the axis A, and which is centrally crossed by the housing 71.

The device 100 comprises a peripheral connecting outline 5 which is obtained around the outer race 3, and a complementary connecting outline 6, which is in turn obtained inside the brake disk 7 and which delimits the internal housing 71 in a radial direction, and which presents a shape which is complementary to the peripheral connecting outline 5 in order to render the brake disk 7 and the bearing 1 angularly integral in relation to each other.

According to the illustration which is shown in FIG. 2, the outline 5 is arranged substantially in correspondence to the surface 31, and is conformed, like the outline 6 in relation to the axis A, according to a tapering shape which tapers towards the surface 31 itself. In addition, the outlines 5 and 6 present a radius R which is of variable dimensions with continuity on a plane which is transverse to the axis A, and they each comprise a number N1 of convex portions 51, 61 in relation to the axis A itself, and a number N2 of concave portions 52, 62 in relation to the axis A.

The values of the numbers N1 and N2 depend on the necessary construction and planning characteristics, and may be equal to each other as in this example, or on the other hand, they might be different from each other. In particular, in FIG. 2, a case is illustrated in which the number N1 and the number N2 have a value which is equal to 3 and the portions 51, 61 and 52, 62 are alternated in relation to each other around the axis A. As an alternative, and in a manner which may be easily understood from the foregoing description, the outlines 5 and 6 may each be provided with only a single relative convex portion 51, 61 which may be arranged between two relative portions 52, 62 which are contiguous in relation to each other.

The tapering form of the outline 5 and of the outline 6 permit the immediate centering of the brake disk 7 onto the bearing 1, as well as, as will be better described below, the subsequent axial blocking of the brake disk 7 onto the bearing 1.

With the aim of standardising the production of the bearing 1 in such a way as to render the external dimensions independent of the dimensions of the brake disk 7, the device 100, as is illustrated in FIG. 3, comprises, as an alternative form of embodiment, an intermediate connecting body 72 which is arranged in an intermediate position between the outer race 3 and the annular body 75. The intermediate body 72 is mounted inside the housing 71 of the annular body 75 independently of the annular body 75 itself, and is radially delimited towards the inside by a complementary connecting outline 6' which is engaged on the outline 5, and towards the outside by a peripheral connecting outline 5' which is engaged by the complementary connecting outline 6.

The presence of the pairs of outlines 5-6' and 5'-6 means that it is possible to render angularly integral in relation to each other the brake disk 7, the outer race 2, and the intermediate portion 72 themselves.

Each pair of outlines 5-6' and 5'-6, in addition to presenting a tapering shape which tapers towards the surface 31, also follows the same law of variation which has been described above in terms of the outlines 5 and 6, although each pair might present a value for the numbers N1 and N2 which might be equal to or different from the values of the numbers N1 and N2 of the other pair, just as each pair of outlines may present a tapering factor in relation to the axis A which might be equal to or different from the other pair of outlines.

In accordance with that which has been described above, it is obvious that the possibility of producing a bearing 1 which is provided with the device 100 renders the bearing 1 itself suitable for being assembled with brake disks 7 of different dimensions without any need whatsoever for modifying the external geometrical characteristics of the same bearing 1. In addition, the alternative possibility of having the intermediate body 72, the connection of which to the annular body 75 exploits the principle of the complementary outlines, also permits the production of the annular bodies 75 for brake disks 7 with standardised internal dimensions which thus involves a subsequent additional saving of resources.

The tapering form of the outlines 5 and 6 also permits, as has been described above, the unilateral axial blocking of the brake disk 7 on the bearing 1 itself, and also permits the mounting of the brake disk 7 into the bearing 1 without any kind of interference.

In order to block the brake disk 7 in complete axial fashion on the bearing 1, the device 100 comprises an axial blocking device 80 which is arranged in a position which is axially outside the bearing 1, and above all, it acts with its own axial thrust in the growing direction of the tapering nature of the outlines 5-6, or 5-6'.

In the alternative forms of embodiment which are shown in FIGS. 1 and 3, the device 80 comprises a small border 81, which is obtained by means of deforming a free border of the outer race 3 by rolling, and it is rolled in such a way as to abut the brake disk 7, or rather to abut the intermediate body 72, further planting the brake disk 7, or rather the intermediate body 72, in the growing direction of the tapering nature of the outlines 5-6, or 5-6'.

It is obvious that the above description is applicable, without the need for any further explanation, in the case that the race of the bearing 1 on which the brake disk 7 is mounted, whether provided or not with the intermediate body 72, is defined by the inner race 2, and not by the outer race 3, and with the aim of providing a better definition of this concept, the forms of embodiment which are shown in FIGS. 3 to 10 will now be described.

In FIGS. 3 to 10, the connection device 100 connects the brake disk 7 to the inner race 2 of the bearing 1, and is positioned from the side of the surface 22 while still exploiting the principle of the outlines 5 and 6 which has been described above, but decreasing towards the surface 22 itself.

In addition, at least according to the illustrations which are shown in FIGS. 4-7, the connection device 100 is also used to connect a flange 76 to the outer race 3, the flange 76 being axially arranged opposite the brake disk 7, and is axially blocked by the small border 81 onto the outer race 3 itself.

In cases of the kind, the flange 76 may also be interpreted as an additional external body in the same way as the brake disk 7 which has been described above, of which, in practice, it takes the place, and comprises a respective inner housing, which takes the number 71 for reasons of similarity, which is radially delimited towards the inside by a respective complementary connecting outline, which also takes the number 6 for reasons of similarity, and is suitable for permitting the mechanical installation of the bearing 1.

The outline 6 of the flange 76 is rendered angularly integral with the outer race 3 by means of a peripheral connecting outline, which also takes the number 5 for reasons of similarity and is obtained on the outer race 3 itself, and is axially blocked onto the outer race 3 by means of the small border 81. All that has already been specified regarding the connecting outlines, both peripheral and complementary, also holds good in the case of the flange 76, and thus does not require any further explanation.

In the forms of embodiment which are illustrated in FIGS. 4-7, the blocking device 80, in addition to comprising the small border 81 for axially blocking the flange 76 onto the outer race 3 from the side of the surface 31, also comprises respective blocking elements, which will gradually be described in detail, and which axially block the brake disk 7 onto the inner race 2 from the side of the surface 22. Although in the forms of embodiment which are illustrated in FIGS. 4-7 the brake disk 7 also comprises the intermediate body 72, it is intended that all that will be described may be applied even in the case that the brake disk 7 is not provided with the intermediate body 72.

Now, with reference to FIG. 4, the blocking device 80 also comprises a fixing body 82, which is provided with a central cylindrical portion 83 which is partially inserted inside the cylindrical housing 23, and is also provided with a disk 84 which is orthogonal and integral with the portion 83 itself.

The disk 84 extends in such a way as to abut the surface 22 and the intermediate body 72, or rather on either side of the outlines 5 and 6', in order to exert an action of axial thrust on the intermediate body 72 itself in the growing direction of the tapering nature of the outlines 5 and 6'. The portion 83 may, for example, be connected to a homokinetic joint (which is noted but not illustrated) which is integral with the bearing 1.

In the form of embodiment which is illustrated in FIG. 5, the blocking device 80 also comprises an additional small rolled border 85, which is obtained by deforming the inner race 2 from the side of the surface 22, and is rolled in such a way as to abut the intermediate body 72 not only to axially block the intermediate body 72 itself, but also to centre the intermediate body 72 in relation to the axis A while exploiting the tapering nature of the outlines 5 and 6'.

In the form of embodiment which is illustrated in FIG. 6, the inner race 2 comprises a cylindrical body 24, which extends axially outside the bearing 1 and transverse to the surface 22, and functions as a support element for the blocking device 80.

In particular, the body 24 is a hollow body, and the device 80 also comprises a fixing bushing 86 which is externally screwed onto the body 24, and is provided with an end flange 87, which extends in such a way as to abut the surface 22 and the intermediate body 72, or rather on either side of the outlines 5 and 6', and thrusts the intermediate body 72 axially towards the inside of the bearing 1.

Figure 7:
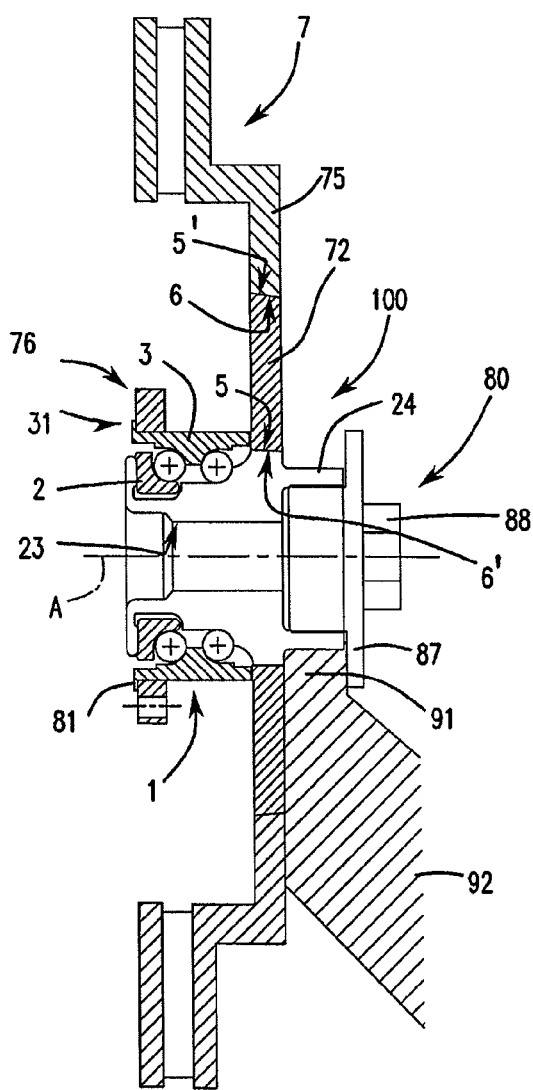

In the form of embodiment which is illustrated in FIG. 7, the blocking device 80 also comprises an annular portion 91, which is shrink fit onto the cylindrical body 24 transverse to the axis A, and is axially arranged in such a way as to abut the annular body 75 and the intermediate body 72, or rather on either side of both the outlines 5 and 6', and the outlines 5' and 6'. The annular portion 91 is defined, in cases of the kind, by an internal border of a rim 92 which is centred on the cylindrical body 24.

Finally, the blocking device 80 also comprises a fixing nut 88, which is screwed inside the body 24, and is provided with an external flange 89 which extends radially outside the body 24 and in such a way as to abut both the body 24 and the portion 91 in order to axially block the portion 91 onto the body 24 and, as a consequence, to axially block the annular body 75 onto the intermediate body 72, and the intermediate body 72 onto the outer race 3.

In the forms of embodiment which are illustrated in FIGS. 8-11, the flange 76 and the intermediate body 72 are rendered integral with the outer race 3 and, respectively, with the inner race 2. In particular, the intermediate body 72 defines a mounting flange 72' for the brake disk 7 radially delimited towards the outside by the outline 5, on which is mounted the outline 6 of the brake disk 7 itself, which, in its turn, is composed of the annular body 75 presenting internally the housing 71, or rather radially delimited towards the inside by the outline 6 for being angularly coupled onto the outline 5.

Figure 10:
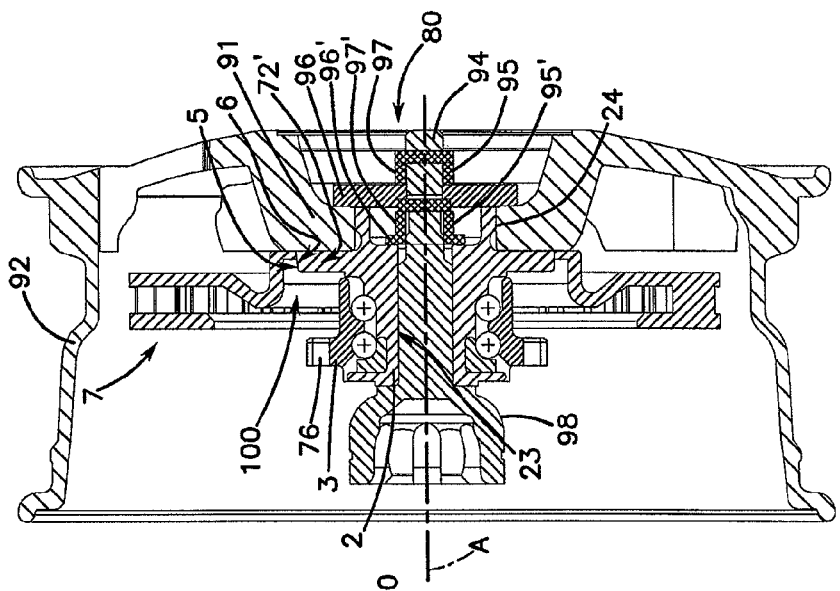
Figure 9:
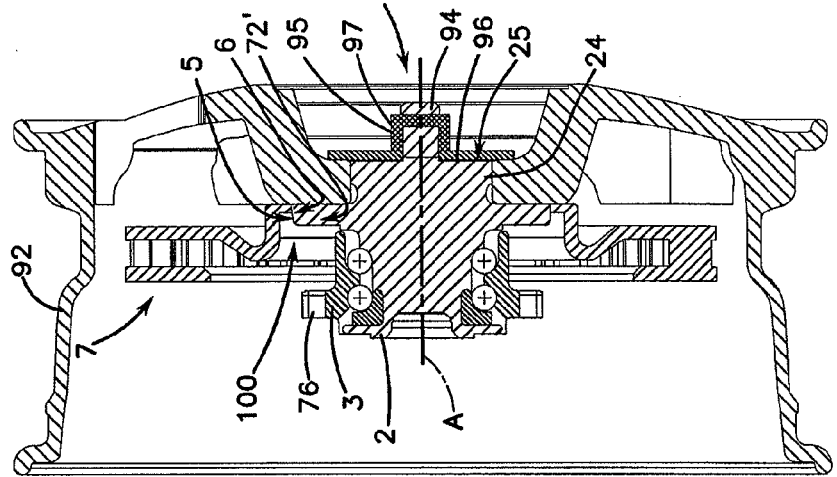
Figure 8:
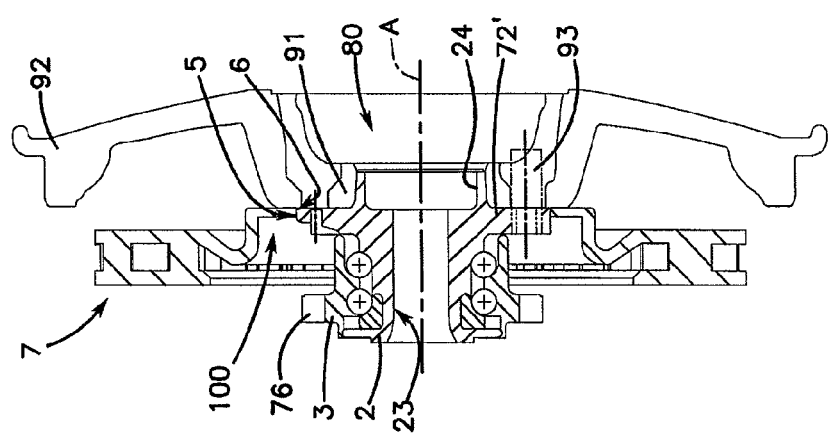

In addition, in all the forms of embodiment which are illustrated in FIGS. 8-10, the axial blocking device 80 of the brake disk 7 on the flange 72' is produced, on one side, by means of the tapering nature of the outlines 5 and 6 and, on the opposite side, by the annular portion 91 of the rim 92 centred on the cylindrical body 24, as well as by additional blocking elements of the device 80 which act between the body 24 and the rim 92 in order to thrust the portion 91 against the brake disc 7 and the flange 72', and which will gradually be described in detail in the rest of this description which follows.

In the form of embodiment which is illustrated in FIG. 8, the blocking device 80 comprises a number of fixing screws 93, only one of which is illustrated, which are uniformly distributed around the axis A, and which are arranged through the portion 91 in order to be screwed through the flange 72'.

In the form of embodiment which is illustrated in FIG. 9, the housing 23 of the inner race 2 as well as the cylindrical body 24 are completely solid, and the body 24 is axially delimited by a frontal surface 25 which is transverse to the axis A.

The blocking device 80 comprises a central support body 94 which is produced in a single piece with the body 24 and which extends along the axis A starting from the surface 25, a nut 95 which is screwed onto the body 94, and a safety washer 96 which is mounted and centred on the body 94.

The washer 96 is axially thrust by the nut 95 against the surface 25 and the portion 91 of the rim 92, and is also blocked by the nut 95 itself, the accidental unscrewing of which is prevented by an elastic split rivet 97 which is arranged through the body 94 transverse to the axis A.

In the form of embodiment which is illustrated in FIG. 10, the cylindrical body 94 defines the terminal end of a homokinetic joint 98 which is mounted inside the housing 23 and through/across the body 24.

In this case, the washer 96 is blocked by the nut 95 in such a way as to abut the frontal surface of the body 24 and the portion 91, while the blocking device 80 comprises an additional nut 95' which is screwed onto the body 94, and an additional washer 96' which is mounted onto the body 94 itself, and which is blocked by the nut in such a way as to abut the inner race 2 in order to axially block the body 94 in relation to the inner race 2 itself.

Finally, the blocking device 80 comprises an additional elastic split rivet 97' which is arranged through the body 94 and is also engaged with the nut 95' in order to prevent the accidental unscrewing of the nut 95'.

Figure 11:
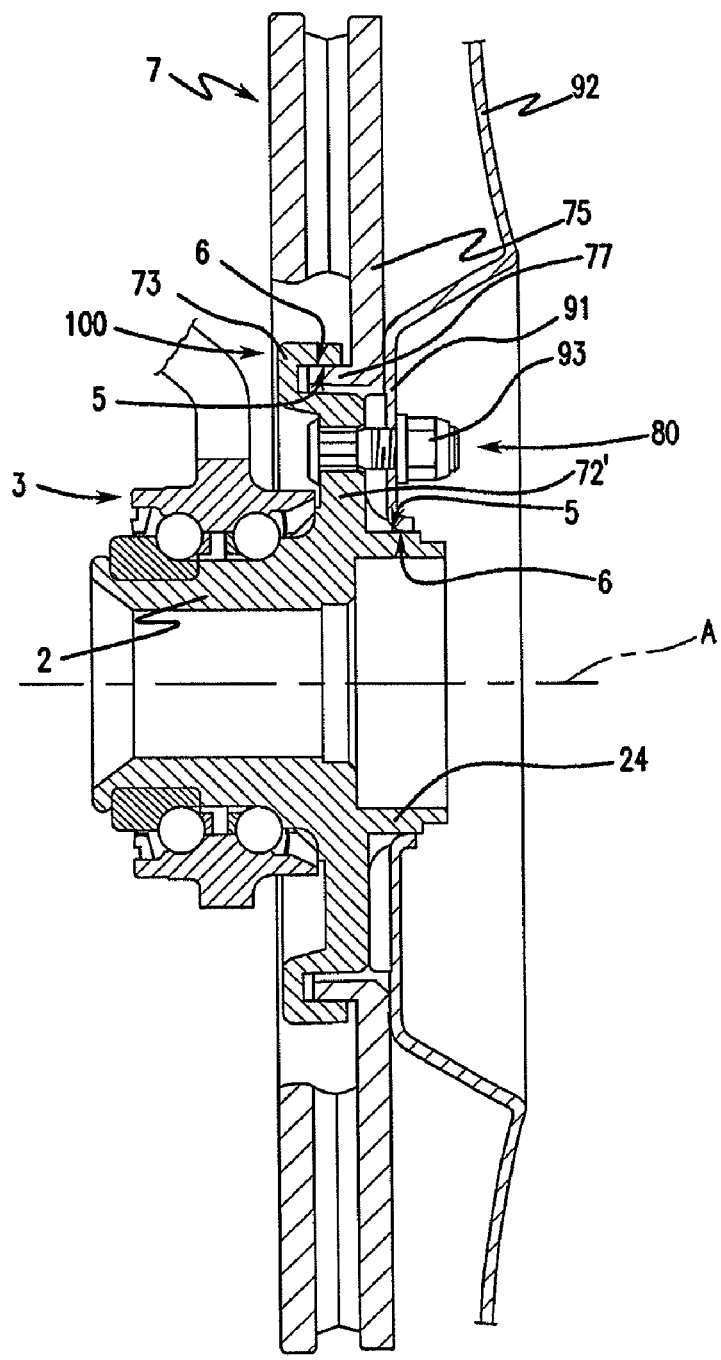

The form of embodiment which is illustrated in FIG. 11 refers to a connection device 100' which is similar to the device 100, from which the device 100' differs due to the fact that the radial positions of the peripheral connecting outline 5 and the complementary connecting profile 6 are inverted, or rather the housing 71 is no longer an internal housing, but is an external housing which is delimited in a radial direction towards the outside by the outline 6 on which is mounted the outline 5.

In particular, in the device 100', the mounting flange 72' is provided with a ribbed peripheral portion 73 which is U-shaped and axially open towards the rim 92, while the annular body 75 is provided with a cylindrical nut 77, which is arranged transverse to the body 75 itself in order to define the housing 71, and is radially delimited towards the outside by the outline 6.

Also in the device 100', the blocking device 80 comprises a number of fixing screws 93, only one of which is illustrated, which are uniformly distributed around the axis A, and are arranged through the portion 91 in order to be screwed through the flange 72', and in order to block the nut 77 which is axially inserted inside the ribbed peripheral portion 73.

Finally, in the forms of embodiment which are illustrated in FIGS. 8 to 11, the connection device 100 or 100' may also be interposed between the cylindrical body 24 and the rim 92 with the aim of improving the centering and mounting of the rim 92 on the cylindrical body 24.

In these latter cases in particular, the peripheral connecting outline 5 is obtained around the body 24, while the complementary connecting outline 6 is obtained inside the annular portion 91 of the rim 92 in such a way as to render the body 24 and the portion 91 angularly integral in relation to each other, and to facilitate, by means of its own tapering shape, the centering of the rim 92 on the inner race 2.

It is intended that the present invention should not be limited to the forms of embodiment which are herein described and illustrated, which are to be considered as examples of forms of embodiment of the connection device for connecting a rolling contact bearing to an external body, and which may instead be subject to further modifications relating to the shape and disposition of its parts, as well as to details pertaining to construction and assembly.

The invention claimed is:

1. Connection device for connecting a contact rolling bearing to an external body, the bearing having a rotation axis, and comprising two races which are co-axial in relation to each other and in relation to the rotation axis, the connection device comprising a peripheral connecting outline, which is circumferentially obtained along an inner first race of said two races, and a complementary connecting outline, which is circumferentially obtained along the external body, and which has a shape complementary to the peripheral connecting outline in order to render angularly integral in relation to each other the external body and the first race; wherein the peripheral connecting outline and the complementary connecting outline both have a continuous radius of angularly variable dimensions on a plane which is transverse to the rotation axis, wherein the peripheral connecting outline and the complementary connecting outline taper in relation to the rotation axis, and both comprise, in relation to the rotation axis, at least one respective convex portion wherein the external body is defined by a brake disk including an internal housing; wherein said complementary connecting outline radially delimits towards the internal housing;

axial blocking means arranged axially outside the first race, the axial blocking means being associated with the first race to force the external body onto the first race.

2. Connection device according to claim 1, wherein the peripheral connecting outline and the complementary connecting outline both comprise, in relation to the rotation axis, a first determined number of convex portions and a second determined number of concave portions.

3. Connection device according to claim 2, wherein the first determined number of convex portions and the second determined number of concave portions coincide with each other; the convex portions being alternated around the rotation axis in relation to the concave portions.

* * * * *